(12) United States Patent
Matsunaga (10) Patent No.: US 8,091,598 B2
(45) Date of Patent: Jan. 10, 2012

(54) MOTORCYCLE TIRE

(75) Inventor: Satoshi Matsunaga, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 217 days.

(21) Appl. No.: 12/483,384

(22) Filed: Jun. 12, 2009

(65) Prior Publication Data

US 2009/0308515 A1 Dec. 17, 2009

(30) Foreign Application Priority Data

Jun. 17, 2008 (JP) ................................ 2008-158317

(51) Int. Cl.
*B60C 1/00* (2006.01)
*B60C 11/00* (2006.01)
*B60C 11/04* (2006.01)

(52) U.S. Cl. ............ 152/209.5; 152/209.11; 152/209.26; 152/209.27; 152/209.28; 152/901

(58) Field of Classification Search ............... 152/209.5, 152/209.11, 209.26, 209.27, 209.28, 901
See application file for complete search history.

(56) References Cited

U.S. PATENT DOCUMENTS

| 4,289,182 A | 9/1981 | Sato et al. | |
|---|---|---|---|
| 2005/0115653 A1* | 6/2005 | Miyasaka et al. | 152/209.1 |
| 2006/0207701 A1* | 9/2006 | Tanaka | 152/209.5 |
| 2010/0147427 A1* | 6/2010 | Ishiyama | 152/209.25 |

FOREIGN PATENT DOCUMENTS

| DE | 3411667 | * | 11/1984 |
|---|---|---|---|
| DE | 3424796 | * | 1/1985 |
| EP | 1946942 A1 | | 7/2008 |
| JP | 61-27707 A | | 2/1986 |
| JP | 63-194004 U | | 12/1988 |
| JP | 6-55909 A | | 3/1994 |
| JP | 07-290906 | * | 11/1995 |
| JP | 7-290906 A | | 11/1995 |
| JP | 10-244811 A | | 9/1998 |
| JP | 11-198609 A | | 7/1999 |
| JP | 2007-099042 | * | 4/2007 |
| JP | 2007-210364 A | | 8/2007 |

OTHER PUBLICATIONS

Machine translation for Japan 2007-099042 (no date).*
Machine translation for Japan 07-290906 (no date).*
Machine translation for German 3,424,796 (no date).*
Machine translation for German 3,411,667 (no date).*

* cited by examiner

*Primary Examiner* — Steven D Maki
(74) *Attorney, Agent, or Firm* — Birch, Stewart, Kolasch & Birch, LLP (57) ABSTRACT

A motorcycle tire comprises a tread portion having a tread face curved along a radially outwardly convex arc in the cross section of the tire including the rotational axis of the tire. The tread face is provided in the ground contacting region during straight running with three parallel circumferential grooves which are: a wide circumferential groove having a width Wg1 of from 8 to 16 mm and extending along the tire equator; and a pair of narrow circumferential grooves disposed one on each side of the tire equator and having a width Wg2 less than the width Wg1. Each of the narrow circumferential grooves is positioned such that the distance L1 measured along the tread face from the tire equator to the axially outside edge of the narrow circumferential groove is not more than 35% of the width (tw) of the ground contacting region during straight running measured along the tread face.

7 Claims, 8 Drawing Sheets

CONVENTIONAL ART

MOTORCYCLE TIRE

BACKGROUND OF THE INVENTION

The present invention relates to a pneumatic tire, more particularly to a tread pattern for a motorcycle tire capable of reducing the rolling resistance.

Figure 8:
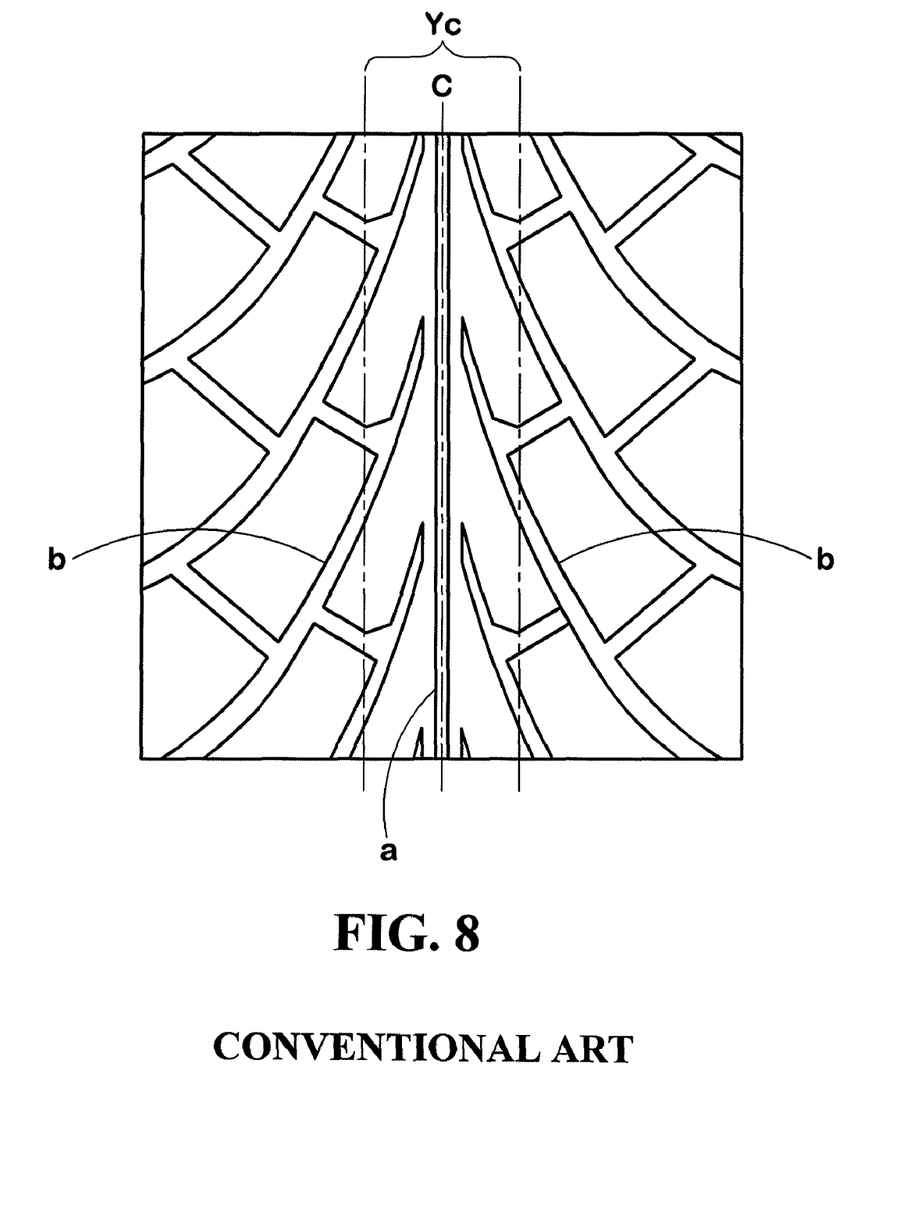
FIG. 8 is a developed view showing an example of the tread pattern of a conventional motorcycle tire.

In the conventional motorcycle tires, there are widely employed tread patterns comprising a single central groove (a) extending continuously in the tire circumferential direction along the tire equator c and a plurality of oblique lateral grooves (b) arranged in a v-formation, as shown in FIG. 8 for example. In such conventional tread patterns, in order to secure a sufficient ground contacting area during straight running and thereby to provide the improved dry grip performance for the tire, the central groove (a) has a relatively narrow width of about 6 mm. Further, in order to improve the wet grip performance during straight running, the oblique lateral grooves (b) extend axially outwardly from the vicinity of the central groove (a), namely, the axially inner portions of the oblique lateral grooves (b) exist in the ground contacting region Yc during straight running.

In recent years, on the other hand, even in the motorcycle tires, it is strongly required to reduce the rolling resistance in order to decrease the fuel consumption of the motorcycles.

Therefore, the present inventor studied a tread pattern and found that the axially inner portions of the oblique lateral grooves (b), which exist in the ground contacting region Yc during straight running, are a large factor of the rolling resistance, and the rolling resistance can be reduced by eliminating the axially inner portions from the region Yc. But, if there is no groove in the region Yc, contrary to expectation, the rolling resistance is increased. The present inventor conducted experiments, making various tread patterns, and discovered that the rolling resistance of a motorcycle tore can be minimized when the ground contacting region Yc during straight running is provided with only circumferential grooves of a specific number and dimensions.

SUMMARY OF THE INVENTION

It is therefore, an object of the present invention to provide a motorcycle tire, in which the rolling resistance is effectively reduced without sacrificing other tire performances.

According to the present invention, a motorcycle tire comprises a tread portion having a tread face extending between the extreme edges Te of the tread portion in the tire axial direction along a radially outwardly convex arc in the cross section of the tire including the rotational axis of the tire, wherein the tread face is provided in a ground contacting region Yc during straight running with three parallel circumferential grooves which are a wide circumferential groove having a width Wg1 of from 8 to 16 mm and extending along the tire equator, and a pair of narrow circumferential grooves disposed one on each side of the tire equator and having a width Wg2 less than the width Wg1, and each of the narrow circumferential grooves is positioned such that the distance L1 measured along the tread face from the tire equator to the axially outside edge of the narrow circumferential groove is not more than 35% of the width (tw) of the ground contacting region Yc during straight running measured along the tread face.

In the present invention, since the ground contacting region Yc is provided with the wide circumferential groove having a width of not less than 8 mm and the narrow circumferential grooves, the drainage is increased and the wet grip performance during straight running can be improved though the oblique lateral grooves are not provided.

Further, since the tread rubber volume in the ground contacting region Yc is reduced by the three circumferential grooves, the energy loss caused in the tread rubber is decreased, and the rolling resistance can be improved.

Furthermore, since the narrow circumferential grooves are provided with a width smaller than the width of the central wide circumferential groove, and the positions of the axially outside edges of the narrow circumferential grooves are limited at a distance L1 of not more than 35% of the width (tw) of the ground contacting region Yc from the tire equator, deterioration of the transient property from straight running to turning or from turning to straight running can be prevented.

In this specification, various dimensions, positions and the like refer to those under a normally-inflated unloaded condition of the tire unless otherwise noted. The normally-inflated unloaded condition is such that the tire is mounted on a standard wheel rim and inflate to a standard pressure but loaded with no tire load. The undermentioned normally inflated loaded condition is such that the tire is mounted on the standard wheel rim and inflate to the standard pressure and loaded with the standard tire load.

The standard wheel rim is a wheel rim officially approved for the tire by standard organization, i.e. JATMA (Japan and Asia), T&RA (North America), ETRTO (Europe), STRO (Scandinavia) and the like. The standard pressure and the standard tire load are the maximum air pressure and the maximum tire load for the tire specified by the same organization in the Air-pressure/Maximum-load Table or similar list. For example, the standard wheel rim is the "standard rim" specified in JATMA, the "Measuring Rim" in ETRTO, the "Design Rim" in TRA or the like. The standard pressure is the "maximum air pressure" in JATMA, the "Inflation Pressure" in ETRTO, the maximum pressure given in the "Tire Load Limits at various cold Inflation Pressures" table in TRA or the like. The standard load is the "maximum load capacity" in JATMA, the "Load capacity" in ETRTO, the maximum value given in the above-mentioned table in TRA or the like.

The ground contacting region Yc is the region of the tread portion 2 between the axial outermost edges YcE of the ground contacting patch of the tire when the tire under the normally inflated loaded condition is placed on a horizontal surface with the camber angle of zero.

The above-mentioned extreme edges Te are the axially outer extreme ends of the ground contacting region Ys during turning at a large camber angle.

DESCRIPTION OF THE PREFERRED EMBODIMENTS

Embodiments of the present invention will now be described in detail in conjunction with the accompanying drawings.

In the drawings, motorcycle tire 1 according to the present invention comprises a tread portion 2 having extreme edges Te in the tire axial direction, a pair of sidewall portions 3, a pair of bead portions 4 each with a bead core 5 therein, a carcass 6 extending between the bead portions 4 through the tread portion 2 and sidewall portions 3, and a band 7 disposed radially outside the carcass 6 in the tread portion 2.

Figure 1:
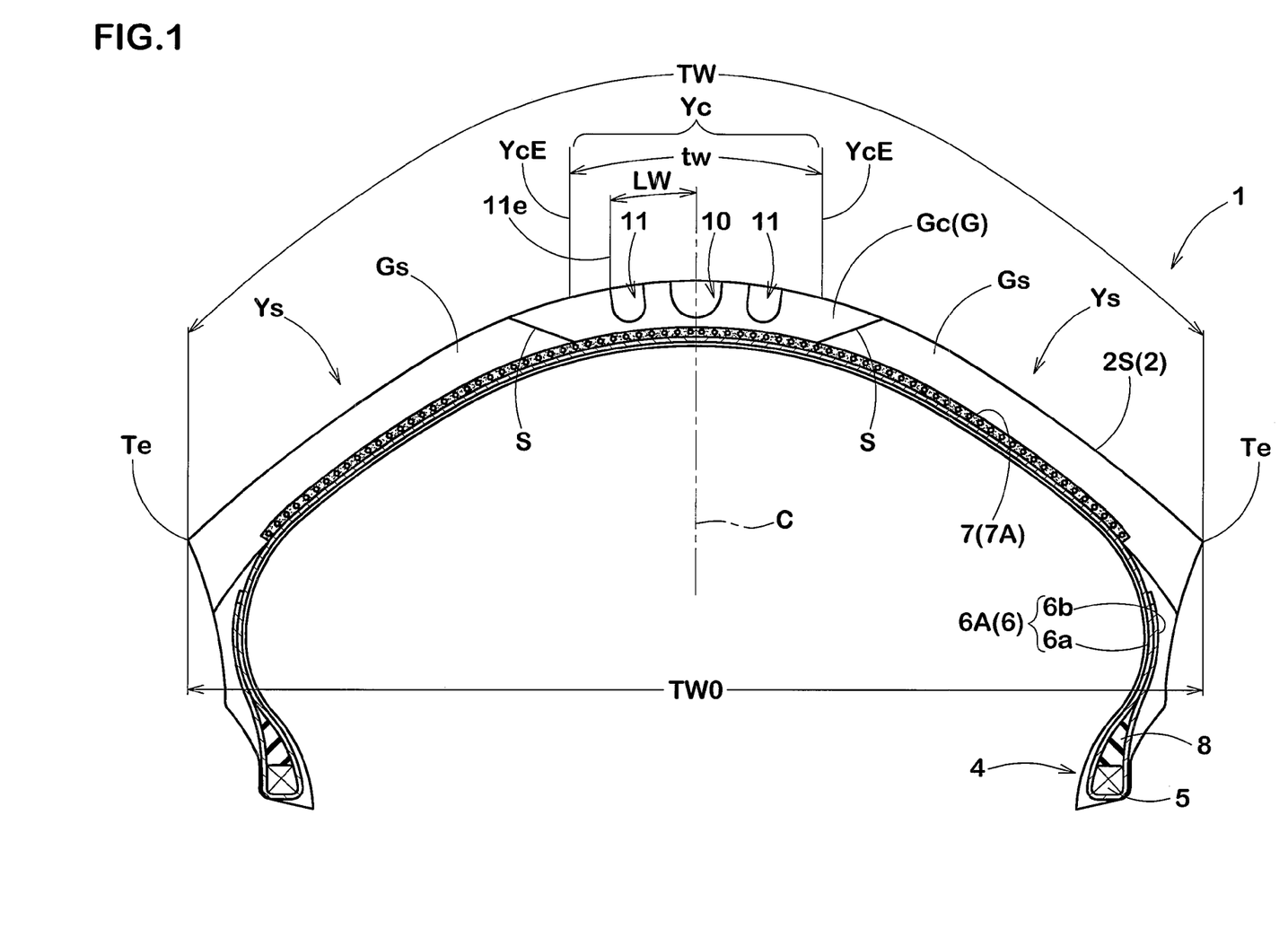
FIG. 1 is a cross sectional view of a motorcycle tire according to the present invention.

FIG. 1 shows the motorcycle tire under the normally-inflated unloaded condition. In order to enable the turning of the motorcycle with a large bank angle (camber angle), the tread face 2S of the tread portion 2 is curved convexly so that the maximum section width of the tire lies between the extreme edges Te. In other words, the axial tread width TW0 between the extreme edges Te is equal to the maximum tire section width. The ground contacting region Yc can be said as the ground contacting region during straight running. As the camber angle of the tire increases, the ground contacting region shifts towards the extreme edge Te.

In the cross section of the tire including the rotational axis of the tire, the curvature of the tread face 2S may be of a single radius of, for example, 0.5 to 1.0 times the axial tread width TW0. In this embodiment shown in FIG. 1, the curvature of the tread face 2S is made up of a crown radius and a shoulder radius. The crown radius is about 0.4 to 0.8 times the axial tread width TW0 (in the example shown in FIG. 1, about 0.5 times TW0), and a crown portion ranging about 50% of the axial tread width TW0 is formed by the crown radius. Accordingly, a shoulder portion of about 25% of the axial tread width TW0 is formed by the shoulder radius which is larger than the crown radius and in a range of about 1.0 to 2.2 times the axial tread width TW0 (in FIG. 1, about 1.5 times TW0).

The carcass 6 is composed of at least one ply 6A (in this embodiment only one ply) of carcass cords arranged radially at an angle in a range of from 70 to 90 degrees with respect to the tire circumferential direction.

The carcass ply 6A extends between the bead portions 4 through the tread portion 2 and sidewall portions 3, and is turned up in each of the bad portions 4 around the bead core 5 from the inside to the outside of the tire so as to form a pair of turned up portions 6b and a carcass ply main portion 6a therebetween. For the carcass cords, organic fiber cords, e.g. nylon, polyester, rayon, aramid and the like can be used. In view of the rolling resistance of the tire, preferably, a relatively thin organic fiber cord whose thickness is not more than 1800 dtex/2 (not more than 3600 dtex in total) is used. This is also advantageous in reducing the weight of the carcass, and thus reducing the fuel consumption.

Between the carcass ply main portion 6a and the turned up portion 6b in each of the bead portions 4, a bead apex rubber 8 is disposed so as to extend radially outwardly from the radially outside of the bead core 5 in order to reinforce the bead portion.

The band 7 is composed of at least one ply 7A (in this embodiment only one ply) of at least one band cord wound helically at an angle of not more than 5 degrees with respect to the tire circumferential direction.

The band ply 7A is centered on the tire equator C in the tire axial direction and extends to have an axial width of not less than 75% of the above-mentioned axial tread width TW0 in order to reinforce the tread portion 2 across the almost entire tread width with its hoop effect.

Further, a belt or breaker(not shown) may be disposed between the band 7 and the carcass 6 or alternately on the radially outside of the crown portion of the carcass 6 instead of the band 7.

The belt is composed of at least one ply of parallel belt cords laid at an angle of from 15 to 60 degrees with respect to the tire circumferential direction.

In order to increase the rigidity of the tread portion and improve the steering stability, usually, the belt comprises two cross plies in which the parallel belt cords of one ply are inclined with respect to the tire circumferential direction in an opposite direction to the parallel belt cords of the other ply.

For the band cords and belt cords, various organic fiber cords, e.g. nylon, rayon, polyester, aramid and the like can be used.

Figure 2:
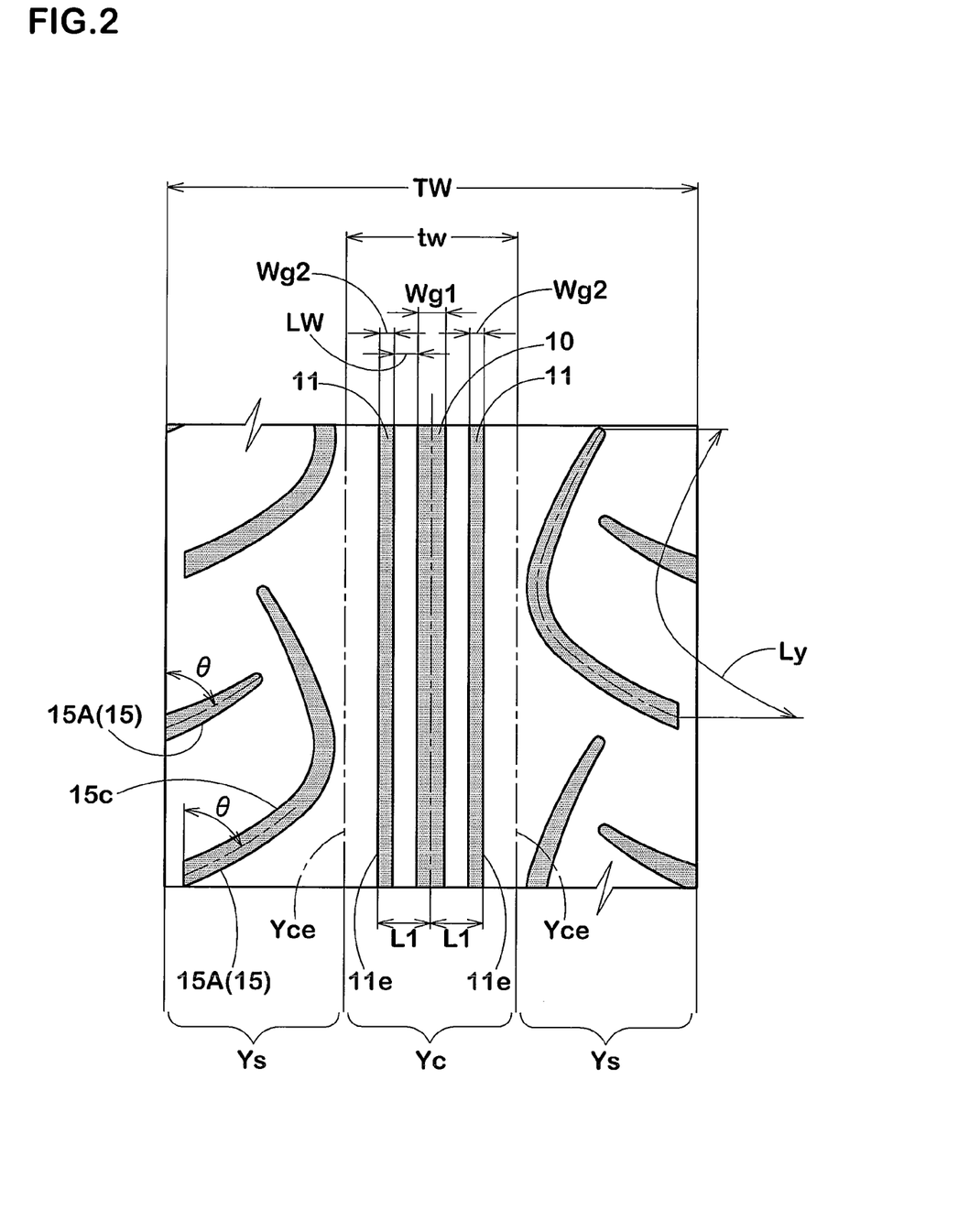
FIG. 2 is a developed view of a part of the tread pattern thereof.

As shown in FIGS. 1 and 2, in the ground contacting region Yc during straight running, there are disposed three circumferential grooves 10 and 11 extending continuously in the tire circumferential direction in parallel with each other. In the ground contacting region Yc, there is no other groove than the three circumferential grooves 10 and 11.

The three circumferential grooves 10 and 11 are a wide circumferential groove 10 on the tire equator C and a pair of narrow circumferential grooves 11 one on each side of the tire equator C.

The groove width Wg1 of the wide circumferential groove 10 is set in a range of from 8 to 16 mm, and the groove width Wg2 of the narrow circumferential grooves 11 is set to be less than the groove width Wg1.

In this embodiment, as shown in FIG. 2, the wide circumferential groove 10 and narrow circumferential grooves 11 are straight grooves. But, the three circumferential grooves 10 and 11 may be non-straight grooves or zigzag grooves as shown in FIGS. 4(*a*)-4(*c*).

Figure 4A:
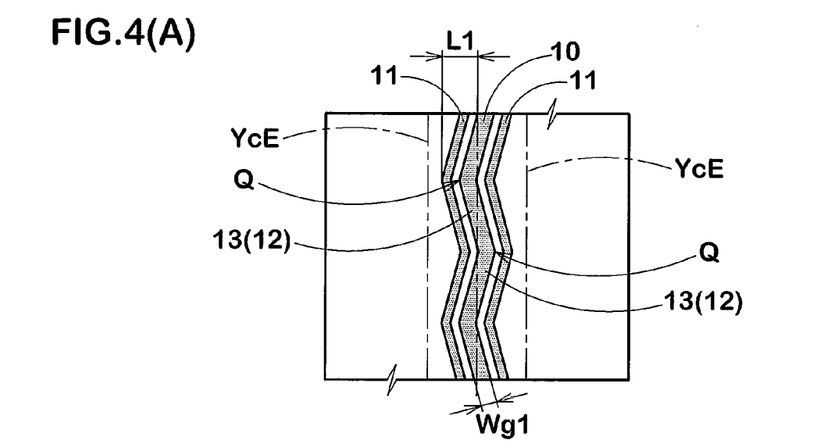
FIGS. 4(A), 4(B) and 4(C) each show another example of the wide and narrow circumferential grooves.

In FIG. 4(A), the wide circumferential groove 10 extends zigzag on the tire equator C, and the narrow circumferential grooves 11 extend zigzag in parallel with the wide circumferential groove 10. In each of the zigzag grooves 10 and 11 in this embodiment, the groove segments 12 thereof extend straight at certain inclination angles with respect to the tire circumferential direction. In other words, each of the groove segments 12 is made up of a single straight part 13.

The groove segment 12 is defined as a part of the zigzag groove extending between the circumferentially adjacent maximum amplitude points Q of the zigzag groove.

Figure 4B:
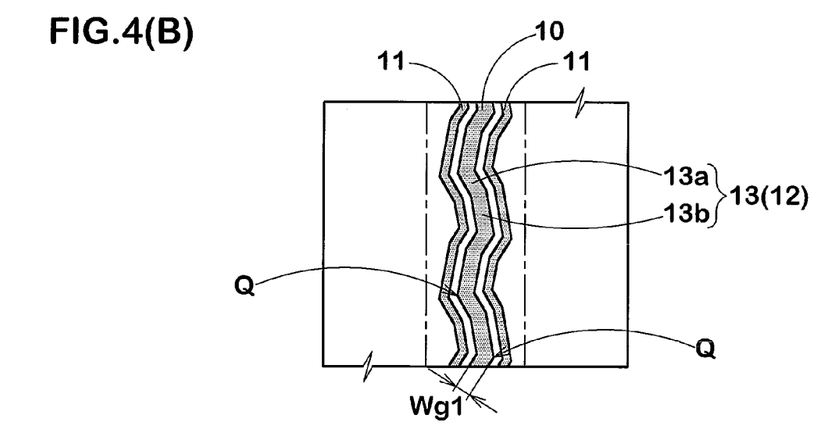
Figure 4C:
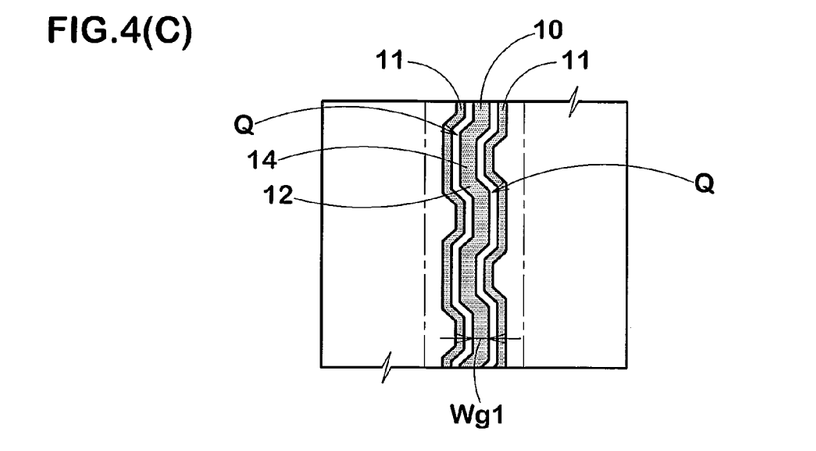

In FIG. 4(B) too, the wide circumferential groove 10 extends zigzag on the tire equator C, and the narrow circumferential grooves 11 extend zigzag in parallel with the wide circumferential groove 10. In each of the zigzag grooves 10 and 11 in this embodiment, the groove segments 12 thereof are each made up of a plurality of straight parts 13 (13*a*, 13*b*) having different inclination angles. Thus, each segment 12 is a bent segment.

In FIG. 4(C), the wide circumferential groove 10 extends zigzag on the tire equator C, and the narrow circumferential grooves 11 extend zigzag in parallel with the wide circumferential groove 10. similar to the former embodiment shown in FIG. 4(B), each of the groove segments 12 can be considered as being made up of a plurality of straight parts having different inclination angles. However, in comparison with the former two embodiments shown in FIG. 4(A) and FIG. 4(B), since the groove segment 12 including a part 14 extending straight in parallel with the tire circumferential direction, this embodiment is not preferable in view of the rolling resistance.

Aside from zigzag grooves made up of straight segments 12 or straight parts 13, 14 as explained above, zigzag grooves made up of smoothly curved elements 12 like a sinusoidal waveform may be used.

As briefly mentioned above, as a result of experiments conducted by the present inventor, it was discovered that three circumferential grooves disposed in the ground contacting region Yc during straight running can reduce the rolling resistance of the tire during straight running.

Figure 3A:
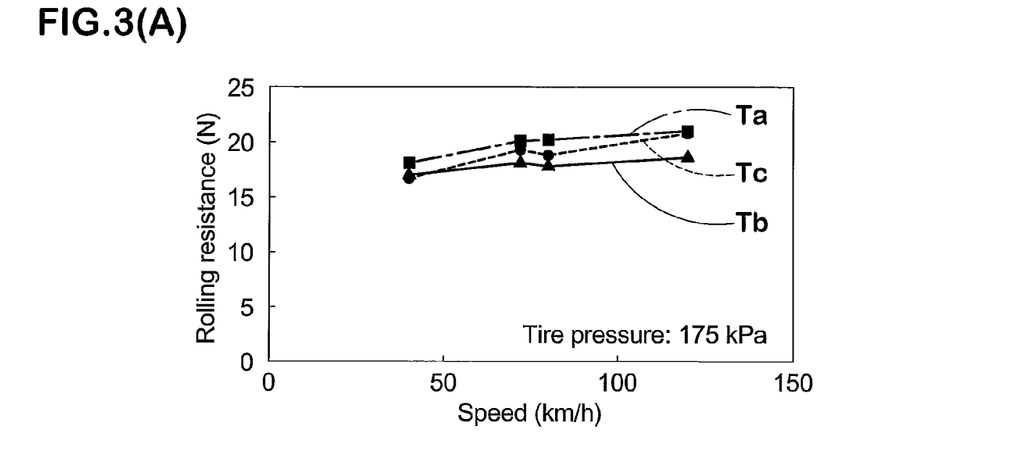
FIGS. 3(A), 3(B) and 3(C) are graphs showing the rolling resistance of three types of tires measured under various conditions to show the advantageous effect of the tire according to the present invention.
Figure 3B:
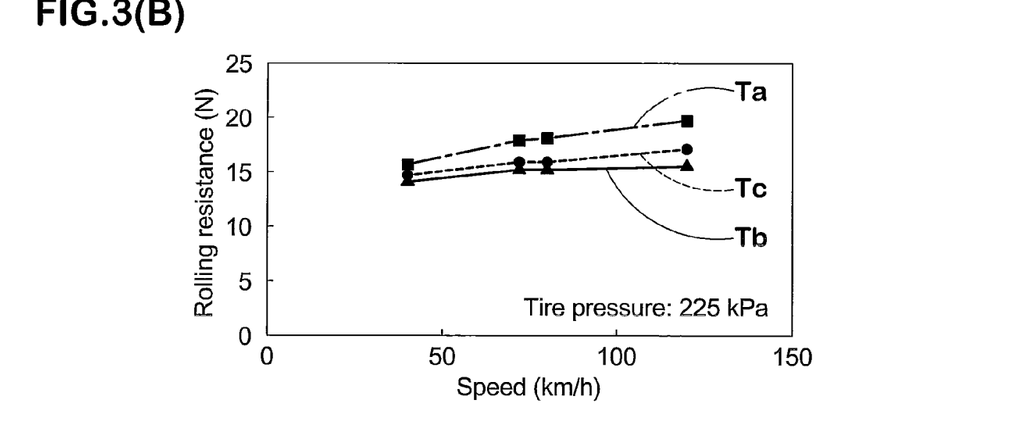
Figure 3C:
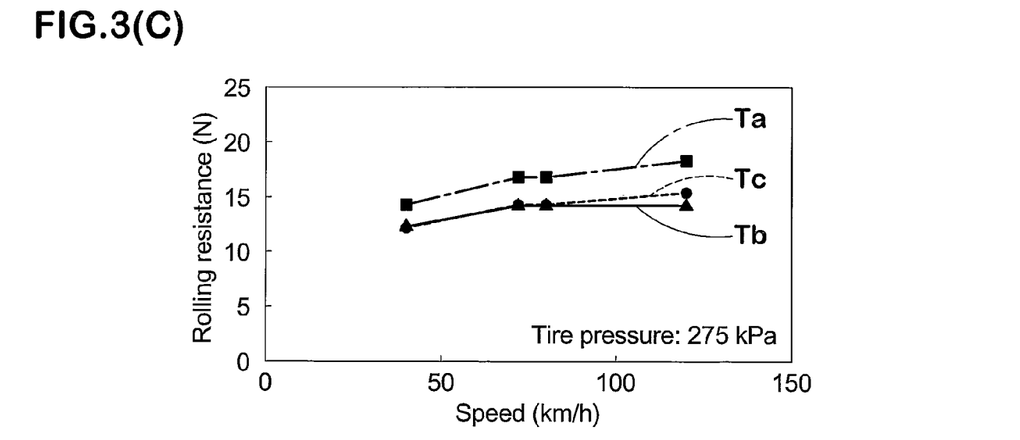

FIGS. 3(A), 3(B) and 3(C) show the rolling resistance of three types of tires Ta, Tb and Tc measured under the following conditions.

Figure 7A:
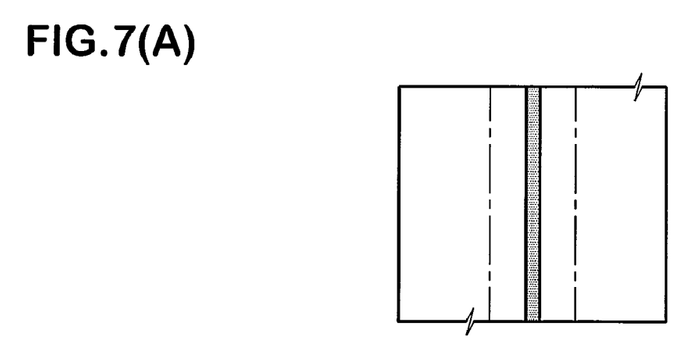
FIGS. 7(A), 7(B) and 7(C) show partial tread patterns for the ground contacting regions during straight running employed in comparative tires in the undermentioned comparative tests.
Figure 7B:
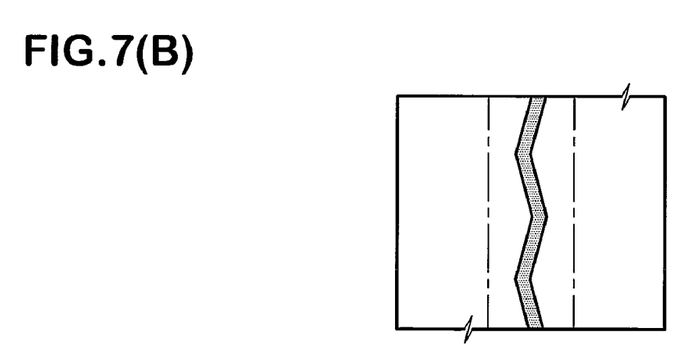
Figure 7C:
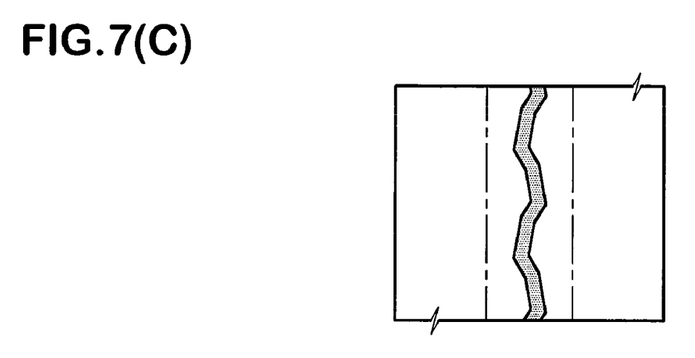

Running speed: 40, 72, 80 and 120 km/h
Tire pressure: 175, 225 and 275 kPa
Tire load: 0.93 N
Camber angle: 0 degree The tire Ta was provided with only one straight circumferential groove having a width of 5 mm and disposed on the tire equator c as shown in FIG. 7(A).

The tire Tb was provided with only three straight circumferential grooves 10 and 11 in the ground contacting region Yc during straight running as shown in FIG. 2, wherein the groove width Wg1 was 8 mm, and the groove width Wg2 was 5 mm.

The tire TC was a slick tire having no groove.

The sizes of all the tires Ta, Tb and TC were 70/90-17.

As shown in the figures, the rolling resistance of the tire Ta became larger than that of the slick tire Tc at all the running speeds and tire pressures. Therefore, it is supposed that, due to the circumferential groove, the movement or deformation of the tread rubber around the circumferential groove is increased, and the rolling resistance of the tire Ta is increased.

In contrast, the rolling resistance of the tire Tb became smaller than that of the slick tire Tc in general, although in some conditions the rolling resistance of the tire Tb was substantially same as the slick tire Tc. The reason is supposed to be that due to the three circumferential grooves, although the movement or deformation of the tread rubber is increased to increase the energy loss, the volume of the tread rubber is decreased and the energy loss caused by the tread rubber is decreased more than the increase, thus, the energy loss is decreased in total and the rolling resistance is reduced.

Therefore, if the groove width Wg1 of the wide circumferential groove 10 is less than 8 mm, the effect to reduce the energy loss owing to the decreased tread rubber volume is decreased, and it becomes difficult to decrease the rolling resistance. If the groove width Wg1 is more than 16 mm, the ground contacting area during straight running is significantly decreased, and problems arise such that the dry grip and steering stability during straight running deteriorate. Based on these standpoints, it is preferable that the groove width Wg1 is not less than 10 mm but not more than 14 mm.

If the three circumferential grooves 10 and 11 are not parallel each other, partial movement or deformation of the tread rubber during straight running is increased, and accordingly, the energy loss increases, therefore, it is difficult to decrease the rolling resistance.

The distance L1 measured along the tread face 2S from the tire equator C to the axially outside edge 11e of each of the narrow circumferential grooves 11 is set to be not more than 35% of the width (tw) of the ground contacting region Yc measured in the tire axial direction along the tread face 2S. In the case that the narrow circumferential grooves 11 are zigzag, as shown in FIG. 4(A), the distance L1 is measured from the tire equator to the axially outermost point (maximum amplitude point Q) of the axially outside edge 11e.

If the distance L1 is more than 35% of the width (tw), in the transitional state from straight running to turning, the change in the tire characteristics becomes large and thus the transient property is deteriorated.

In view of the transient property, therefore, it is preferable that the distance L1 is not more than 30% of the width (tw).

If the groove width Wg2 of the narrow circumferential grooves 11 is increased, there is a tendency that the transient property is deteriorated. If the narrow circumferential grooves 11 are too narrow, the decrease in the tread rubber volume is reduced, and the effect to reduce the rolling resistance is lessened.

Therefore, it is preferable that the difference (Wg1−Wg2) between the groove width Wg1 and the groove width Wg2 is set in a range of from 1 to 4 mm.

Further, the total groove width (Wg1+Wg2+Wg2) is preferably set to be not more than 30% of the width (tw) in order to secure the ground contacting area during straight running and to maintain the dry grip and steering stability.

In order to decrease the movement of the tread rubber during straight running, the width LW of the resultant circumferentially continuously extending rib formed between the wide circumferential groove 10 and each of the narrow circumferential grooves 11 is preferably set to be not less than 5 mm when measured in the tire axial direction along the tread face 2S.

In the ground contacting region Ys which is a lateral region of the tread face positioned on each side of the ground contacting region Yc, there is no circumferential groove extending continuously in the tire circumferential direction, but oblique lateral grooves 15.

The oblique lateral groove 15 has its major part 15A whose inclination angle theta is in a range of from 30 to 80 degrees with respect to the tire circumferential direction. In the case that the oblique lateral groove 15 is a curved groove 15c or the oblique lateral groove 15 has a curved part 15d2, the angle theta is that of the tangent to the widthwise center line of the groove 15.

Such oblique lateral grooves 15 facilitate wet grip during turning without deteriorating the transient property when the motorcycle is banked.

If the angle theta is less than 30 degrees or a circumferential groove is disposed in the ground contacting region Ys during turning, then there is a tendency that the banking speed is abruptly increased when changing from straight running to turning. If the angle theta is more than 80 degrees, the drainage performance is deteriorated.

Based on these standpoints, the length of the major part 15A measured therealong is set to be not less than 50%, preferably not less than 70%, most preferably 100% of the overall length Ly of the oblique lateral groove 15 measured therealong.

In this embodiment, as shown in FIG. 2, the oblique lateral grooves 15 include V-shaped long grooves and slightly curved short grooves. Each of the V-shaped long grooves extends axially inward, starting from a position near one of the edges Te, then turns axially outward near the borderline between the regions Ys and Yc and terminates at the midpoint of the region Ys. Each of the slightly curved short grooves extends axially inward from one of the edges Te, and terminates at the midpoint of the region Ys.

FIGS. 5(A)-5(E) show examples of the oblique lateral grooves 15.

Figure 5A:
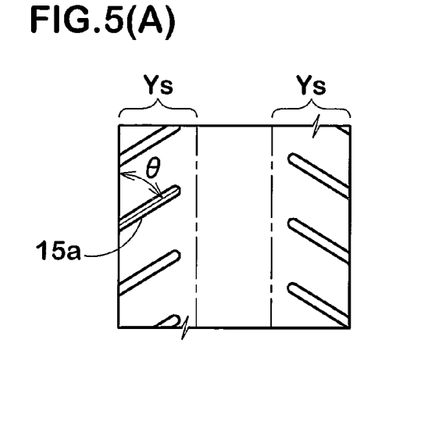
FIGS. 5(A), 5(B), 5(C), 5(D) and 5(E) show examples of the oblique lateral grooves.

In FIG. 5(A), the oblique lateral grooves 15 are a straight groove 15a inclined at a constant angle theta.

Figure 5B:
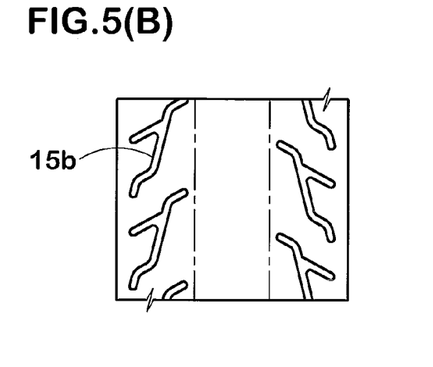

In FIG. 5(B), the oblique lateral grooves 15 are a branched groove 15b made up of straight parts having different angles theta.

Figure 5C:
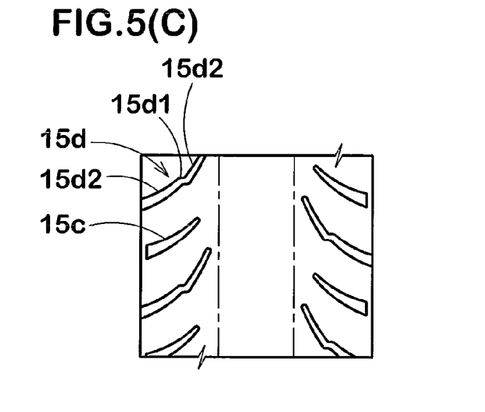

In FIG. 5(C), the oblique lateral grooves 15 include: slightly curved grooves 15c whose angle theta is continuously changed; and hybrid grooves 15d each made up of a straight part 15d1 having a constant angle theta and a curved part 15d2 having a variable angle theta.

Figure 5D:
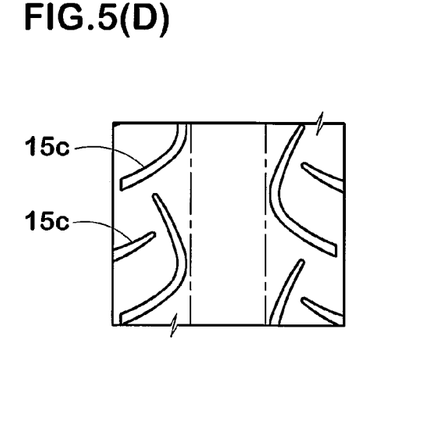

FIG. 5(D) shows only the oblique lateral grooves 15 shown in FIG. 2.

Figure 5E:
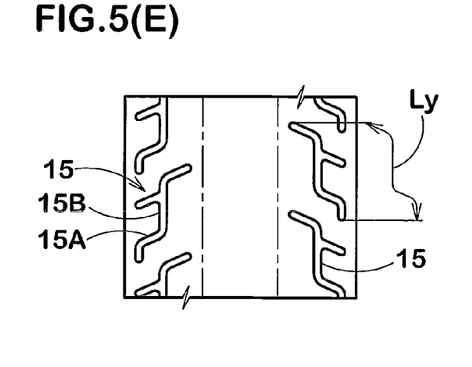

In FIG. 5(E), similarly to FIG. 5(B) the oblique lateral grooves 15 are a branched groove 15b made up of straight parts having different angles theta. In this example, the major part of the oblique lateral groove 15 has angles theta outside the above-mentioned range of from 30 to 80 degrees. Especially, the length of a straight part 15B parallel with the tire circumferential direction is relatively large. Therefore, this example is not preferable when compared with the FIG. 5(B) example.

As shown in FIG. 1, the tread rubber G in this example is constructed from a crown tread rubber Gc centered on the tire equator C, and a shoulder tread rubber Gs disposed on each side thereof in the tire axial direction.

In order to further improve the rolling resistance during straight running, the crown tread rubber Gc is made of a low-hysteresis-loss rubber compound having a loss tangent Dc in a range of from 0.1 to 0.2.

In order to improve the grip performance during turning, the shoulder tread rubber Gs is made of a rubber compound having a loss tangent Ds larger than the loss tangent Dc of the crown tread rubber Gc, and the difference (Ds-Dc) therebetween is set to be not less than 0.05 and preferably not more than 0.15.

Figure 6:
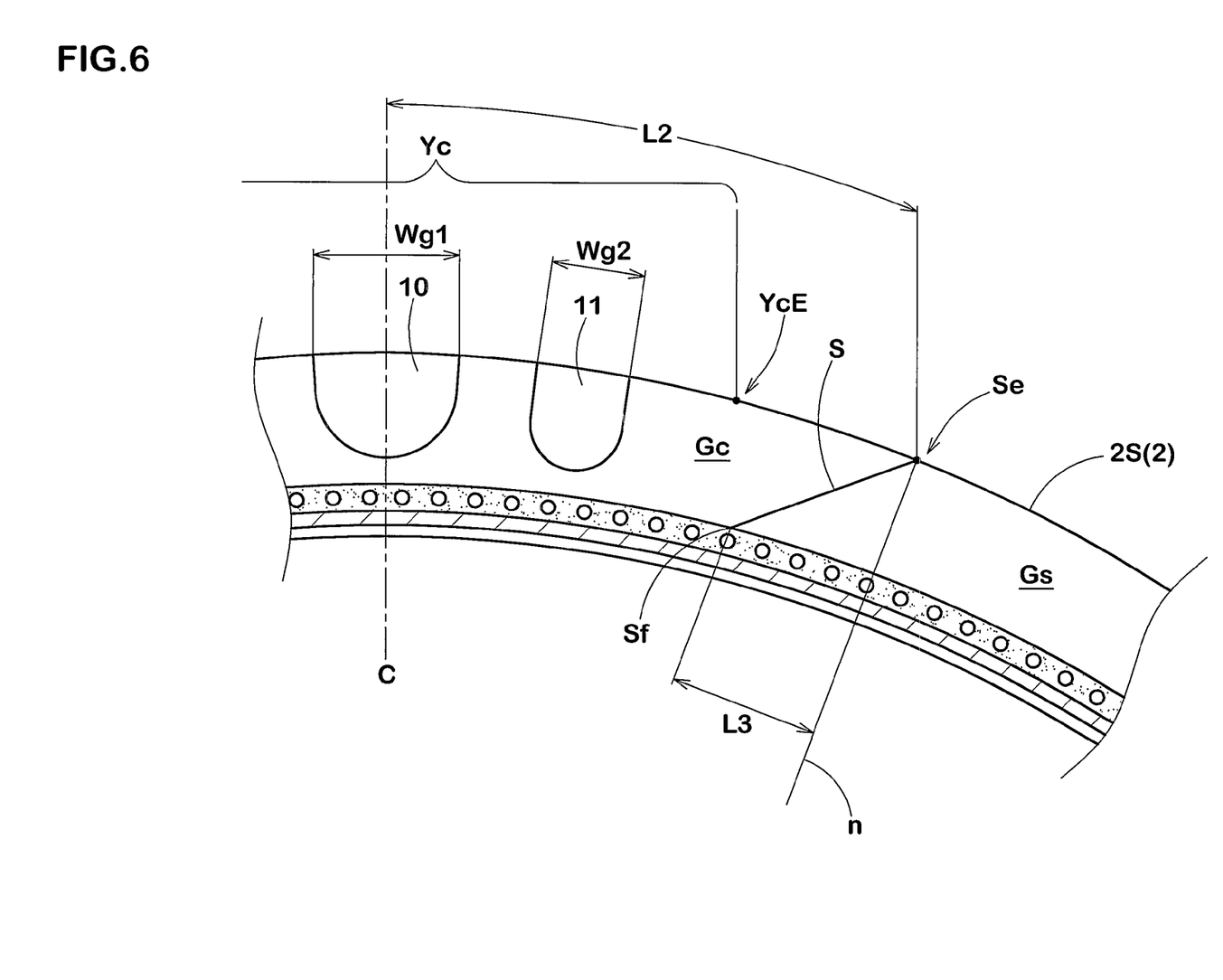
FIG. 6 is an enlarged cross sectional view of a part of the tread portion showing the interface between the crown tread rubber and shoulder tread rubber.

Here, the loss tangent D is measured according to the Japanese Industrial standard K6394 under the following conditions:
Initial strain: 10%
Amplitude: +/-1%
Frequency: 10 Hz
Temperature: 70 deg.C
Measuring mode: Tensile As shown in FIG. 6, in the cross section of the tire including the tire rotational axis, the intersecting point of the tread face 2S with the interface s between the crown tread rubber Gc and each shoulder tread rubber Gs, namely, the radially outer end se of the interface s is positioned outside of the ground contacting region YC during straight running, and the distance L2 measured along the tread face 2S from the tire equator C to the radially outer end Se of the interface s is not more than 25% of the tread arc width Tw measured along the tread face 2S between the extreme edges Te.

Preferably, towards the radially inside, the interface s is inclined axially inwards with respect to a normal line (n) to the tread face 2S at the radially outer end Se of the interface s, and the distance L3 of the radially inner end sf of the interface s from the normal line (n) is in a range of from 3 to 10 mm.

owing to the crown tread rubber Gc, the energy loss during straight running is further reduced, and accordingly, the rolling resistance is reduced. Further, since the heat generation is lessened, the high-speed durability can be improved.

If the distance L2 is more than 25%, then the grip performance during turning becomes insufficient because the frictional force of the low hysteresis loss rubber is relatively small.

In the case of straight running, even if the fundamental frictional force is relatively small, due to the increased ground contact pressure, a sufficient frictional force can be secured. Further, under wet conditions, owing to the three circumferential grooves 10 and 11, drainage is enhanced, and a sufficient wet grip performance can be provided.

During turning, on the other hand, the shoulder tread rubber Gs produces a larger frictional force owing to the larger loss tangent, therefore, a high grip performance can be obtained. If the loss tangent Dc is less than 0.1, it becomes difficult to provide a substantial strength for the tread rubber.

If the loss tangent Dc is more than 0.2, it is difficult to reduce the rolling resistance.

If the difference (Ds-Dc) is less than 0.05, it becomes difficult to improve the grip performance during turning.

If the difference (Ds-Dc) is more than 0.15, the difference in the elastic property between the two rubbers increases and the transient property tends to become worse.

As explained above, the interface s is inclined, therefore, the tread rubber existing in the ground contacting patch is gradually changed between the crown tread rubber Gc and shoulder tread rubber Gs when the bank angle of the motorcycle is changed, therefore, abrupt changes in the transient property can be prevented.

If the distance L3 is less than 3 mm, the change in the transient property becomes quick and therefore, not preferable.

If the distance L3 is more than 10 mm, the shoulder tread rubbers Gs having a larger hysteresis loss approach the ground contacting region Yc, therefore the rolling resistance during straight running is increased. Further, as the tread wear is progressed, the borderlines between the crown tread rubber Gc and shoulder tread rubbers Gs at the tread face 2S are moved largely in the tire axial direction, therefore, the turning point of the transient property is changed in relation to the bank angle of the motorcycle.

Comparison Tests

Motorcycle tires of size 70/90-17 (rim size 17×1.40) having the identical internal structure shown in FIG. 1 and different tread structures shown in Table 1 were made and tested for the dry grip performance, wet grip performance, high speed straight running stability, high speed cornering stability, and rolling resistance.

Dry Grip Performance Test and Wet Grip Performance Test

A motorcycle of 110 cc displacement provided on the front wheel with the test tire inflated to 225 kPa was run on a dry asphalt road and a wet asphalt road, and the road grip performance during straight running was evaluated by the test rider.

The results are shown in Table 1 by an index based on Ref.1 tire being 100, wherein the larger the value, the better the grip performance.

High Speed Straight Running Stability Test and High Speed Cornering Stability Test Further, the motorcycle was run on a dry asphalt road, and the steering stability during high speed straight running at the limit speed, and the steering stability (transient property) during high speed turning at the limit speed were evaluated by the test rider.

The results are shown in Table 1 by an index based on Ref.1 tire being 100, wherein the larger the value, the better the stability.

Rolling Resistance Test

Using a tire tester, the rolling resistance of the test tire was measured under the following conditions.

Speed: 80 km/h
Tire load: 0.93 kN
Tire pressure: 225 kPa

The results are shown in Table 1 by an index based on Ref.1 tire being 100, wherein the larger the value, the smaller the rolling resistance.

TABLE 1

| Tire | Ref. 1 | Ref. 2 | Ex. 1 | Ref. 3 | Ref. 4 | Ref. 5 | Ex. 2 | Ex. 3 | Ex. 4 | Ex. 5 | Ex. 6 |
|---|---|---|---|---|---|---|---|---|---|---|---|
| Ground contacting region Yc | | | | | | | | | | | |
| Pattern (FIG.) | 7(A) | 7(A) | 2 | 7(A) | 7(C) | 7(C) | 4(B) | 2 | 2 | 2 | 4(B) |
| Wide circum. groove | | | | | | | | | | | |
| Number of groove | 1 | 1 | 1 | 1 | 1 | 1 | 1 | 1 | 1 | 1 | 1 |
| Groove width Wg1 (mm) | 5 | 8 | 8 | 14 | 5 | 10 | 10 | 8 | 8 | 8 | 10 |
| Narrow circum. groove | | | | | | | | | | | |
| Number of groove | 0 | 0 | 2 | 0 | 0 | 0 | 2 | 2 | 2 | 2 | 2 |
| Groove width Wg2 (mm) | — | — | 5 | — | — | — | 5 | 5 | 5 | 5 | 5 |
| (L1/tw) × 100 | — | — | 25 | — | — | — | 30 | 25 | 25 | 25 | 30 |
| Ground contacting region Ys | | | | | | | | | | | |
| Pattern (FIG.) | 5(D) | 5(D) | 5(D) | 5(D) | 5(B) | 5(B) | 5(B) | 5(D) | 5(D) | 5(D) | 5(B) |
| Crown tread rubber | | | | | | | | | | | |
| Loss tangent Dc | 0.15 | 0.15 | 0.15 | 0.15 | 0.15 | 0.15 | 0.15 | 0.2 | 0.15 | 0.15 | 0.15 |
| Shoulder tread rubber | | | | | | | | | | | |
| Loss tangent Ds | 0.15 | 0.15 | 0.15 | 0.15 | 0.15 | 0.15 | 0.15 | 0.25 | 0.25 | 0.25 | 0.25 |
| Distance L2 (mm) | — | — | — | — | — | — | — | 25 | 20 | 25 | 20 |
| Distance L3 (mm) | — | — | — | — | — | — | — | 10 | 5 | 5 | 5 |
| Rolling resistance | 100 | 90 | 75 | 90 | 100 | 95 | 80 | 105 | 75 | 75 | 80 |
| Dry grip | 100 | 95 | 95 | 90 | 100 | 95 | 90 | 90 | 110 | 90 | 100 |
| Wet grip | 100 | 12 | 125 | 130 | 100 | 125 | 130 | 115 | 125 | 110 | 130 |
| High speed stability | | | | | | | | | | | |
| Straight running | 100 | 110 | 110 | 110 | 100 | 110 | 110 | 110 | 110 | 110 | 110 |
| Turning | 100 | 100 | 100 | 100 | 100 | 100 | 100 | 105 | 100 | 105 | 100 |

The invention claimed is:

1. A motorcycle tire whose tread portion has a tread face extending from the tire equator to a tread edge while curving in a convex arc-like manner, wherein:
    within a ground contacting region during straight running where the tread face comes into contact with the ground during straight running, said tire is provided with
    a central circumferential main groove extending on the tire equator continuously in the circumferential direction in a linear fashion or in a zigzag manner, and
    a pair of central circumferential sub grooves extending continuously in the circumferential direction in parallel with the central circumferential main groove passing through on both sides of the central circumferential main groove;
    said ground contacting region during straight running is provided with no grooves but said central circumferential main groove and the central circumferential sub grooves, and thereby land portions between said central circumferential main groove and central circumferential sub grooves are formed as ribs continuous in the tire circumferential direction;
    said tread face is provided in its region axial outside said ground contacting region during straight running with no circumferential groove extending continuously in the tire circumferential direction but oblique lateral grooves having a major part extending at an angle of from 30 to 80 degrees with respect to the circumferential direction;
    a groove width Wg1 of said central circumferential main groove is in a range of from 8 to 16 mm, and a groove width Wg2 of the central circumferential sub grooves is smaller than said groove width Wg1 of the central circumferential main groove, wherein the total (Wg1+Wg2+Wg2) of the groove width Wg1 of said central circumferential main groove and the groove widths Wg2 of the central circumferential sub grooves is not more than 30% of the width (tw) of the ground contacting region during straight running, measured along the tread face; and
    a distance L1 measured along the tread face from the tire equator to the axially outside edge of the central circumferential sub groove is not more than 35% of the width (tw) of the ground contacting region during straight running measured along the tread face.

2. The motorcycle tire according to claim 1, wherein said central circumferential main groove and central circumferential sub grooves are in a linear fashion.

3. The motorcycle tire according to claim 1, wherein said central circumferential main groove and central circumferential sub grooves are zigzag grooves and comprise no circumferentially straight parts extending in the circumferential direction in a linear fashion.

4. The motorcycle tire according to claim 1, wherein an inclination angle of said oblique lateral groove with respect to the circumferential direction varies smoothly.

5. The motorcycle tire according to claim 1, wherein a tread rubber forming said tread portion is made of a central rubber portion including the tire equator and a shoulder rubber portion disposed axially outside each side thereof;
    the loss tangent δc of the central rubber portion is in a range of from 0.1 to 0.2, and
    the loss tangent δs of the shoulder rubber portion is more than said loss tangent δc of the central rubber portion by not less than 0.05.

6. The motorcycle tire according to claim 5, wherein
a radially outer end of the interface between said central rubber portion and shoulder rubber portion where the interface intersects the tread face is positioned axially outside said ground contacting region during straight running;
a distance L2 measured along the tread face from the tire equator to the radially outer end of the interface is not more than 25% of the tread arc width TW measured along the tread face between the said tread edges.

7. The motorcycle tire according to claim 6, wherein
said interface is inclined with respect to a normal line to the tread face through a radially outer end of the interface, and
the distance L3 of the radially inner end of the interface from the normal line is in a range of from 3 to 10 mm.

* * * * *